United States Patent [19]

Fava

[11] 4,214,764
[45] Jul. 29, 1980

[54] AXIAL-TYPE SEALING DEVICE ARRANGED TO PROVIDE THE SEAL BETWEEN A STATIONARY AND A ROTATABLE ELEMENT

[75] Inventor: Giulio Fava, Turin, Italy

[73] Assignee: RIV - SKF Officine di Villar Perosa S.p.A., Turin, Italy

[21] Appl. No.: 959,798

[22] Filed: Nov. 13, 1978

[30] Foreign Application Priority Data

Nov. 15, 1977 [IT] Italy .............................. 69570 A/77

[51] Int. Cl.² ............................................. F16H 15/34
[52] U.S. Cl. .................................................. 277/935 D
[58] Field of Search ...................... 277/93, 94, 81, 235, 277/63, 65, 935 D

[56] References Cited

U.S. PATENT DOCUMENTS

| | | | |
|---|---|---|---|
| 3,157,404 | 11/1964 | Doble | 277/93 R |
| 3,547,452 | 12/1970 | Hirata | 277/065 |
| 3,591,188 | 7/1971 | Eisner | 277/65 |
| 3,603,602 | 9/1971 | Padula | 277/235 |
| 3,650,536 | 3/1972 | Shields | 277/935 D |
| 4,114,899 | 9/1978 | Külzer et al. | 277/935 D |

Primary Examiner—Robert L. Smith
Attorney, Agent, or Firm—H. Dale Palmatier

[57] ABSTRACT

A sealing device arranged to provide the seal for a fluid, in particular a liquid, between an ambient and the inside of a cavity comprised between a stationary member and a rotating member is described.

The main feature of this sealing device is that it comprises two annular sealing elements, each of which has a plane annular surface substantially orthogonal to the axis of rotation of the rotating member and a cylindrical side surface orthogonal to the said plane annular surface, one of the said sealing elements being rigidly connected to the stationary member and the other to the rotating member, the said two plane annular surfaces being coupled and axial thrust means being provided which are arranged to keep coupled the said plane annular surfaces with a predetermined pressure, the said two cylindrical side surfaces of the two sealing elements having the same diameter and being substantially coincident.

3 Claims, 4 Drawing Figures

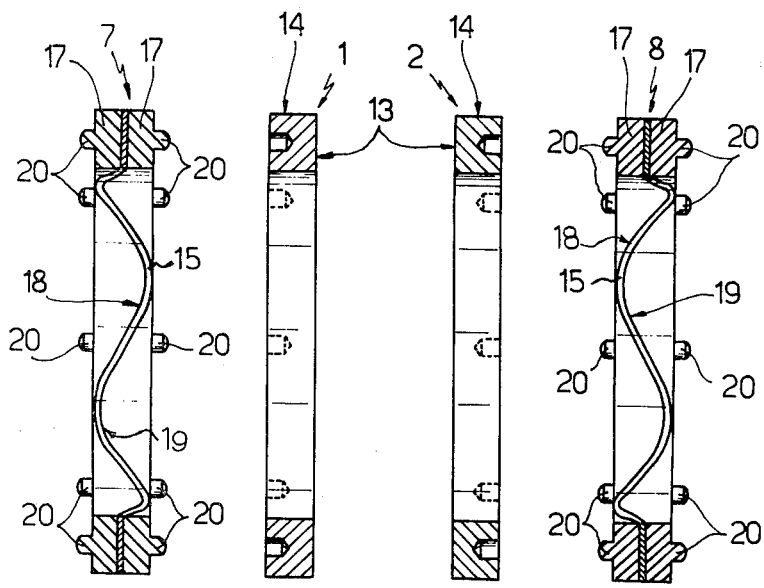
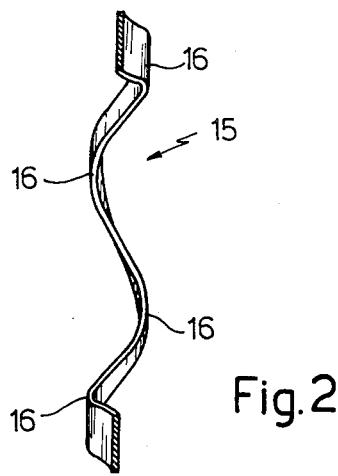
Fig.1
Fig.2

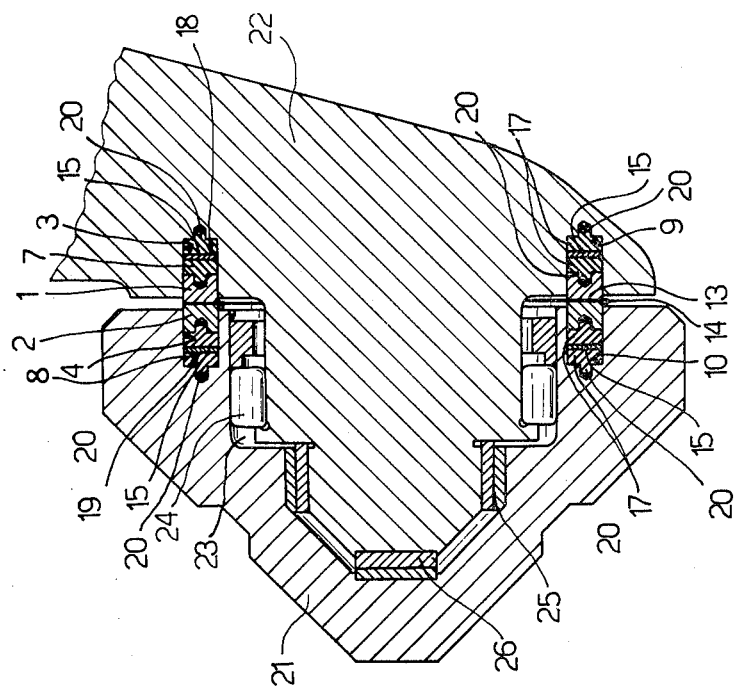
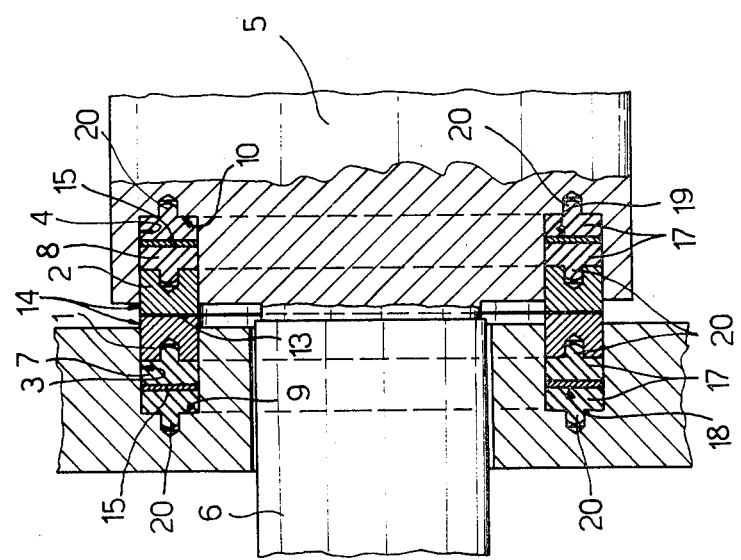
Fig. 4
Fig. 3

AXIAL-TYPE SEALING DEVICE ARRANGED TO PROVIDE THE SEAL BETWEEN A STATIONARY AND A ROTATABLE ELEMENT

BACKGROUND OF THE INVENTION

The present invention relates to sealing device arrange to provide the seal for a fluid, in particular a liquid, between any ambient and the inside of a cavity situated between a stationary member and a rotatable member.

The sealing device according to the invention is of the axial type, i.e. it is arranged to prevent foreign matters from entering un annular space between two surfaces, one of the rotatable member and the other of stationary member, substantially orthogonal to the axis of rotation of the first mentioned member.

Sealing devices of this type are widely used in machines of various types, for example to avoid penetration of materials, in particular fluids, into the cavity which surrounds the surface of a rotating shaft. Such devices are utilized in the rotating drilling tools intended to carry out drilling operations in the mining or oil fields; a tool of this type comprises substantially some rotatable toothed discs each of which is supported by means of rolling and/or plsin bearings on a corresponding pin protruding from a support bar. To avoid penetration of foreign matters (mud, drilling mud, dust) into the cavity of such discs, in which the bearings are located, sealing devices of the mentioned type are provided between the disc and the support bar.

Such sealing devices comprise normally a metal ring coated usually by means of rubber having such a cross-section (for example an S-shaped cross-section) as to be deformable axially, which ring is disposed between two surfaces, one of the stationary member and the other of the rotatable member, orthogonal to the axis of rotation of the latter. Because of the resilient deformation produced by mounting a ring of the type mentioned above between the said surfaces, high axial pressures are exerted between the coupled surfaces of the said ring and the said two members, which pressures are capable of preventing the penetration of foreign matters between those surfaces.

However, the sealing devices of this type have the disadvantage consisting in that they cannot be utilized in the cases in which the pressure of the fluid for which the seal has to be provided is particularly high; in fact, in such cases, the resultant of such pressure is in a position to deform the said sealing ring, thus irremediably damaging it and/or considerably increasing the value of the pressure exchanged between the ring and the coupled surfaces of stationary and rotating members, thus giving rise to severe wear and to seizures.

To avoid the above disadvantages, pressure balancing means are sometimes utilized in association with the devices of the type mentioned hereinabove, which balancing means are arranged to increase the pressure inside the cavity as the outside pressure increases. The sealing devices provided with pressure balancing means obviously result in being complex, rather delicate and bulky.

SUMMARY OF THE INVENTION

It is an object of the present invention to provide a sealing device of the type mentioned hereinabove, having a very simple structure and reduced overall dimensions, by means of which the abovementioned disadvantages are avoided.

According to the present invention there is provided a sealing device arranged to create the seal for a fluid, in particular a liquid, between an ambient and the inside of a cavity comprised between a stationary and a rotating member, comprising two annular sealing elements, each of which has a plane annular surface substantially orthogonal to the axis of rotation of the rotating member and a cylindrical side surface orthogonal to the said plane annular surface, one of the said sealing elements being rigidly connected to the stationary member and the other to the rotating member, the said two plane annular surfaces being coupled and axial thrust means being provided which are arranged to keep coupled the said plane annular surfaces with a pre-established pressure, the said two cylindrical side surfaces of the two sealing elements having the same diameter and being substantially coincident.

BRIEF DESCRIPTION OF THE DRAWINGS

For a better understanding of the invention, some embodiments of the same will now be described with reference to the accompanying drawings, in which:

FIG. 1 is a sectional view of the fundamental elements utilized for providing the device according to the invention;

FIG. 2 is a sectional view of a spring which is part of one of the said elements;

FIG. 3 is a sectional view of a device according to the invention utilized for providing the seal between a stationary member and a rotating shaft of a machine;

FIG. 4 is a sectional view of a device according to the invention utilized for providing the seal between the support bar and the rotatable tool of a drilling head for mines or oil wells.

DETAILED DESCRIPTION OF THE INVENTION

The sealing device of the present invention is of the axial type, i.e. it is arranged to prevent penetration of foreign materials into an annular space defined by two surfaces, one of a stationary member and the other of a rotating member, which surfaces are substantially orthogonal to the axis of rotation of this latter member.

Referring now to FIGS. 1, 2 and 3, the device according to the invention comprises substantially a couple of annular sealing elements 1 and 2, one of which is located in a corresponding annular space 3 of a stationary member (FIG. 3) and the other is located in a corresponding annular space 4 of a rotating member which, in the case of the mebodiment shown in FIG. 3, is formed by an enlarged cylindrical portion 5 of a rotating shaft 6 which passes through a hole formed in the said stationary member.

The device further comprises a couple of thrust elements 7 and 8, each of which is accomodated in a corresponding space 3, 4 situated between the respective sealing element 1, 2 and the bottom surface 9, 10 of the said space.

Each sealing element 1, 2, which in the embodiments shown in the drawings, has a straight rectangular cross-section, possesses a substantially plane front surface 13 orthogonal to the axis of rotation of the shaft 6, as well as a cylindrical side surface 14; the diameters of the said cylindrical surfaces of the two sealing elements 1, 2 are equal to one another, and the two spaces 3 and 4 for said elements are perfectly coaxial, so that the two cylindrical side surfaces 14 of the said elements result in being perfectly coincident, as can be seen from FIG. 3.

The thrust elements 7 and 8 exert onto each sealing element 1 and 2 such axial forces as to push them one against the other in order to keep coupled, with a predetermined pressure, the plane surfaces 13 of the said sealing elements.

Each thrust element comprises substantially a ring-shaped spring 15 which has a corrugated wall arranged to provide a plurality of corrugations 16. Spring 15 is buried in a ring 17 made of a deformable material, such as rubber, elastomer, plastics or the like; the thickness of the said element is substantially equal to that of the respective spring 15, wherefore the front surfaces 18, 19 (FIG. 1) of the corrugations 16 will not be coated with the material of the said element, so that when each thrust ring 7, 8 is mounted in its space 3, 4 there is a direct contact between front surfaces 18, 19 and bottom surface 9 or 10 of spaces 3, 4, and the corresponding sealing element 1, 2 respectively.

Projecting from each front surface of the thrust elements 7, 8 are axial ridges 20 which are arranged to engage in corresponding holes formed both on the bottom 9, 10 of speaces 3 and 4 and on the sealing elements 1 and 2.

The straight cross-sections of the sealing elements 1 and 2 and of the thrust rings 7 and 8 are rectangular, and the inner and outer cylindrical surfaces of the elements and of the rings oincide with each other and coincide respectively with the inner and outer cylindrical surfaces of the spaces 3 and 4; therefore, when thrust elements and sealing elements are accomodated in the respective spaces, they completely fill the said spaces; the depth of each space is chosen such as to let each sealing element 1, 2 project by a predetermined amount from the respective space.

In the embodiment shown in FIG. 4, the sealing device, completely similar to that described hereinabove, is disposed between a rotating tool 21 provided with outer toothed crowns and the support bar 22 of a device for carrying out drilling operations in mines, tunnels, oil wells and the like. In this case, the sealing device serves to prevent infiltration of foreign matters, in particular mud and drilling mud, into the inner cavity 23 of the tool 21, in which there are disposed support rollers 24 and radial plain bearing 25 and axial plain bearings 26.

The operation of the sealing device described hereinabove is as follows.

Thrust rings 7 and 8, because of the springs 15, exert onto the sealing elements 1 and 2 such axial forces as to keep the plane surfaces 13 in contact with one another, with a predetermined, however reduced pressure. During the rotation of the rotating member (anlarged portion 5 and shaft 6 in the embodiment of FIG. 3 and tool 21 in the embodiment of FIG. 4) there is a sliding between the coupled surfaces of the sealing elements; owing to the low value of the contact pressure, during such rotation thereis a small frictional torque and consequently the heating and the wear of said surfaces are very reduced. The heat produced by the friction is transmitted from the sealing elements to the stationary and rotatable members by conduction because of the metal-metal contact between the said elements and the surfaces 18, 19 of the springs 15 and between the opposite surfaces and the bottom surfaces 9, 10 of the respective space 3 or 4.

On the other hand, owing to the engagement of the ridges 20 in the respective holes, any sliding between each sealing element 1 and 2 and the respective thrust element 7 or 8 and between this latter and the stationary or rotating member.

When in the outer ambient surrounding the sealing elements 1 and 2 there is present a foreign matter, even under a high pressure, (which in the case of the embodiment shown in FIG. 3 may be a liquid or simply dust, whilst in the case of the embodiment shown in FIG. 4 it may be dust, mud or drilling mud), such foreign matter cannot traverse the sealing elements 1, 2, however high the said pressure may be; in fact, since the sealing elements are delimited towards the said ambient by two perfectly coaxial cylindrical surfaces 14, no axial resultant is applied on the said sealing elements by the fluid acting in the said ambient, even if the said pressure is very high. It follows that there is no detachment between the coupled plane surfaces 13 of the said elements and thus a perfect seal is maintained between them.

It is obvious that many variations may be applied to the embodiments described hereinabove of the sealing device according to the invention, without departing from the scope of the invention. In particular, the shape of the sealing elements 1 and 2 may be different, provided these elements are in contact with annular plane surfaces and are delimited by the same cylindrical side surface; also the thrust elements may have a structure different from that of the elements 7 and 8, provided they are apt to apply predetermined forces onto the sealing elements.

What we claim is:

1. A sealing device arranged to provide the seal for a fluid, in particular a liquid, between an ambient and the inside of a cavity between a stationary member and a rotating member, comprising two annular sealing elements, each of which has a plane annular surface substantially orthogonal to the axis of rotation of the rotating member and a pair of cylindrical side surfaces each orthogonal to the adjacent plane annular surface, the cylindrical side surfaces of each of the two sealing elements being axially aligned with and having the same diameters as the corresponding two cylindrical side surfaces of the other sealing element, a pair of thrust rings of resiliently compressible and deformable material and having transverse end surfaces, each of said thrust rings having a pair of cylindrical side surfaces aligned with and having the same diameters as the two cylindrical side surfaces of the sealing elements and each of the thrust rings being provided with lugs on each of its end faces, which lugs are arranged to enter corresponding cavities of the stationary and rotating members and of said sealing elements, and at least a pair of metallic annular springs each of which is embedded in a respective thrust ring and is axially corrugated around the periphery thereof in such a way that a part of a first surface of the spring bears on the adjacent sealing element and a part of a second surface of the same spring bears against one of said members.

2. The sealing device according to claim 1 and the stationary member and rotating member providing annular cavity means retaining the sealing elements and thrust rings in coaxial alignment with each other.

3. A coupling for providing a fluid seal, comprising a pair of relatively rotating members, one being stationary and the other one rotating, and confronting each other in an axial direction relative to the rotation axis, the members having annular grooves in confronting and aligned relation with each other, a pair of annular sealing elements and a pair of annular thrust rings, all of said sealing elements and thrust rings having identical inner and outer diameters and being aligned with each other in the grooves of said members, the annular sealing elements each having a plane annular surface substantially orthogonal to the axis of rotation and confronting and engaging the plane annular surface of the other sealing element, each of the thrust rings being at the bottom of a respective annular groove and having means engaging and preventing relative rotation between the adjacent member and the adjacent sealing element, said thrust rings bearing against the sealing elements with significant pressure and each of the thrust rings having a metallic annular spring embedded therein and corrugted endwise around the periphery thereof in such a way that portions of the opposite end faces of the spring are exposed through the end surfaces of the thrust rings to engage and permit heat conduction between the sealing elements and the relatively rotating members, said thrust rings being formed of resiliently compressible and deformable material in which said metallic corrugated springs are embedded.

* * * * *